(12) United States Patent
Seong et al.

(10) Patent No.: US 11,843,967 B2
(45) Date of Patent: Dec. 12, 2023

(54) METHOD FOR PROVIDING LOW LATENCY COMMUNICATION FOR EXTENDED REALITY SERVICE AND ELECTRONIC DEVICE THEREFOR

(71) Applicant: Samsung Electronics Co., Ltd., Suwon-si (KR)

(72) Inventors: Seonik Seong, Suwon-si (KR); Songyean Cho, Suwon-si (KR); Chaeman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 17/496,374

(22) Filed: Oct. 7, 2021

(65) Prior Publication Data

US 2022/0030459 A1    Jan. 27, 2022

Related U.S. Application Data

(63) Continuation of application No. PCT/KR2020/003891, filed on Mar. 20, 2020.

(30) Foreign Application Priority Data

Apr. 11, 2019 (KR) .......................... 10-2019-0042563

(51) Int. Cl.
*H04W 28/02* (2009.01)
*H04W 76/34* (2018.01)
(Continued)

(52) U.S. Cl.
CPC ....... *H04W 28/0268* (2013.01); *G06T 19/006* (2013.01); *H04W 4/023* (2013.01);
(Continued)

(58) Field of Classification Search
CPC ..... H04W 28/0268; G06T 19/006; G06T 3/60
See application file for complete search history.

(56) References Cited

U.S. PATENT DOCUMENTS 9,604,131 B1   3/2017  Kiyohara et al.
9,756,543 B2   9/2017  Nagaraj
(Continued)

FOREIGN PATENT DOCUMENTS

EP  3952602 A1 *  2/2022  ........... G06T 19/006
ES  2655685 T3 *  2/2018  ......... H04L 41/5019
(Continued)

OTHER PUBLICATIONS

E. Grinshpun, D. W. Faucher and S. Sharma, "Intelligent connection manager for seamless interworking of multi-technology mobile devices," in Bell Labs Technical Journal, vol. 15, No. 4, pp. 5-21, Mar. 2011, doi: 10.1002/bltj.20469. (Year: 2011).*

(Continued)

*Primary Examiner* — William D Cumming
(74) *Attorney, Agent, or Firm* — Nixon & Vanderhye P.C.

(57) ABSTRACT

An electronic device provides low latency communication for an extended reality service. Based on a first value of quality of service (QoS) requested by an extended reality (XR) application stored in the electronic device, a first communication connection corresponding to the first value for receiving data regarding an XR service from an XR server is established. Based on a change of a value of the QoS from the first value to a second value, the first communication connection is maintained, and a second communication connection corresponding to the second value is established. Data regarding the XR service from the XR server is received via the second communication connection. The second communication connection can be a radio access technology (RAT) different from the first communication (Continued)

connection and/or a bearer different from the first communication connection.

16 Claims, 10 Drawing Sheets

(51) Int. Cl.
*H04W 76/15* (2018.01)
*H04W 4/02* (2018.01)
*H04W 24/08* (2009.01)
*H04W 84/04* (2009.01)
*G06T 19/00* (2011.01)

(52) U.S. Cl.
CPC ........... *H04W 24/08* (2013.01); *H04W 76/15* (2018.02); *H04W 76/34* (2018.02); *H04W 84/04* (2013.01)

(56) References Cited

U.S. PATENT DOCUMENTS

| | | | |
|---|---|---|---|
| 2009/0176460 A1 | 7/2009 | Mienville et al. | |
| 2017/0332421 A1 | 11/2017 | Sternberg et al. | |
| 2018/0206087 A1 | 7/2018 | Guan et al. | |
| 2018/0211364 A1* | 7/2018 | Nam | G06T 3/60 |
| 2018/0243650 A1 | 8/2018 | Baszucki et al. | |
| 2019/0378244 A1 | 12/2019 | Nam et al. | |
| 2021/0153048 A1* | 5/2021 | Velev | H04W 28/0268 |
| 2021/0153070 A1* | 5/2021 | Velev | H04W 28/0268 |
| 2022/0030459 A1* | 1/2022 | Seong | G06T 19/006 |

FOREIGN PATENT DOCUMENTS

| | | | |
|---|---|---|---|
| KR | 10-2018-0086007 | 7/2018 | |
| KR | 10-2018-0108119 | 10/2018 | |
| KR | 10-2019-0008309 | 1/2019 | |
| WO | 2019/032972 | 2/2019 | |
| WO | WO-2020209521 A1 * | 10/2020 | ........... G06T 19/006 |

OTHER PUBLICATIONS

Extended Search Report and Written opinion dated Apr. 12, 2022 in counterpart European Patent Application No. EP20786741.7.
"3rd Generation Partnership Project; Technical Specification Group SA WG4 Extended Reality in 5G; (Release 16)", 3GPP Standard; Technical Report; 3GPP TR 26.928, 3rd Generation Partnership Project (3GPP), No. V0.3.0, Feb. 10, 2019, pp. 1-19, XP051591891.
Qualcom Incorporated (Rapporteur): "FS_XR5G: Editor's Proposed Updates to Permanent document, v0.3.5", 3GPP TSG-SA4 Meeting 103, Apr. 8-12, 2019, Newport Beach, CA, Apr. 4, 2019, XP051722044.
"Next Generation Protocols (NGP); Scenario Definitions", ETSI GS NGP 001 V1.2.1, May 28, 2017, XP051623478.
"3GPP TR 26.928 V0.3.0", 3rd Generation Partnership Project; Technical Specification Group SA WG4, Extended Reality in 5G; (Release 16), Feb. 2019, 19 pages.
International Search Report for PCT/KR2020/003891 dated Jul. 6, 2020, 5 pages.
Written Opinion of the ISA for PCT/KR2020/003891 dated Jul. 6, 2020, 4 pages.

* cited by examiner

METHOD FOR PROVIDING LOW LATENCY COMMUNICATION FOR EXTENDED REALITY SERVICE AND ELECTRONIC DEVICE THEREFOR

CROSS-REFERENCE TO RELATED APPLICATIONS

This application is a continuation of International Application No. PC/KR2020/003891 designating the United States, filed on Mar. 20, 2020, in the Korean Intellectual Property Receiving Office claiming priority to Korean Patent Application No. 10-2019-0042563, filed on Apr. 11, 2019, in the Korean Intellectual Property Office, the disclosures of which are incorporated by reference herein in their entireties.

BACKGROUND

Field

The disclosure relates to an electronic device and to a method for providing low latency communication for an extended reality service, and an electronic device therefor.

Description of Related Art

Recently, a service that provides an extended reality (XR), which includes augmented reality (AR), virtual reality (VR), mixed reality (MR), and the like, is being developed. Particularly, among XR services, various applications related to a camera, a game, and the like are being widely used by users.

In order for a user to receive, in real time, an extended reality (XR) service related to a camera, a game, and the like that transmits or receives a large capacity of data, low latency communication needs to be performed. Particularly, unlike the conventional voice over internet protocol (VoIP) or voice over long term evolution (VoLTE) service that requires a latency time of 100 ms, the XR service requires a latency time less than or equal to 10 ms. In order to provide a high level of low-latency XR service, proximity among electronic devices needs to be taken into consideration and a communication connection needs to be controlled in real time.

SUMMARY

Embodiments of the disclosure provide a method of providing low-latency communication for an extended reality service, and an electronic device therefor.

According to various example embodiments of the disclosure, a method of operating an electronic device may include: establishing a first communication connection corresponding to a first value to receive data associated with an XR service from an XR server based on the first value of quality of service (QoS) required by an extended reality (XR) application stored in the electronic device, maintaining the first communication connection and establishing a second communication connection corresponding to a second value based on a change of the QoS from the first value to the second value, and receiving the data associated with the XR service from the XR server via the second communication connection, wherein the second communication connection may include one of radio access technology (RAT) different from that of the first communication connection or a bearer different from that of the first communication connection.

According to various example embodiments of the disclosure, an electronic device may include: an extended reality (XR) application, a transceiver, and at least one processor operatively coupled with the XR application and the transceiver. The at least one processor may be configured to: establish a first communication connection corresponding to a first value configured to receive data associated with an XR service from an XR server based on the first value of quality of service (QoS) required by the XR application, maintain the first communication connection and establish a second communication connection corresponding to a second value based on a change of the QoS from the first value to the second value, and receive data associated with the XR service from the XR server via the second communication connection, wherein the second communication connection may include one of radio access technology (RAT) different from that of the first communication connection or a bearer different from that of the first communication connection.

A method and an electronic device therefor according to various example embodiments may provide, with a low latency, an XR service that satisfies a communication condition by managing communication connection of various extended reality (XR) applications overall, and controlling a communication connection in real time to satisfy a communication condition required by an XR application.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to attached drawings.

Figure 1:
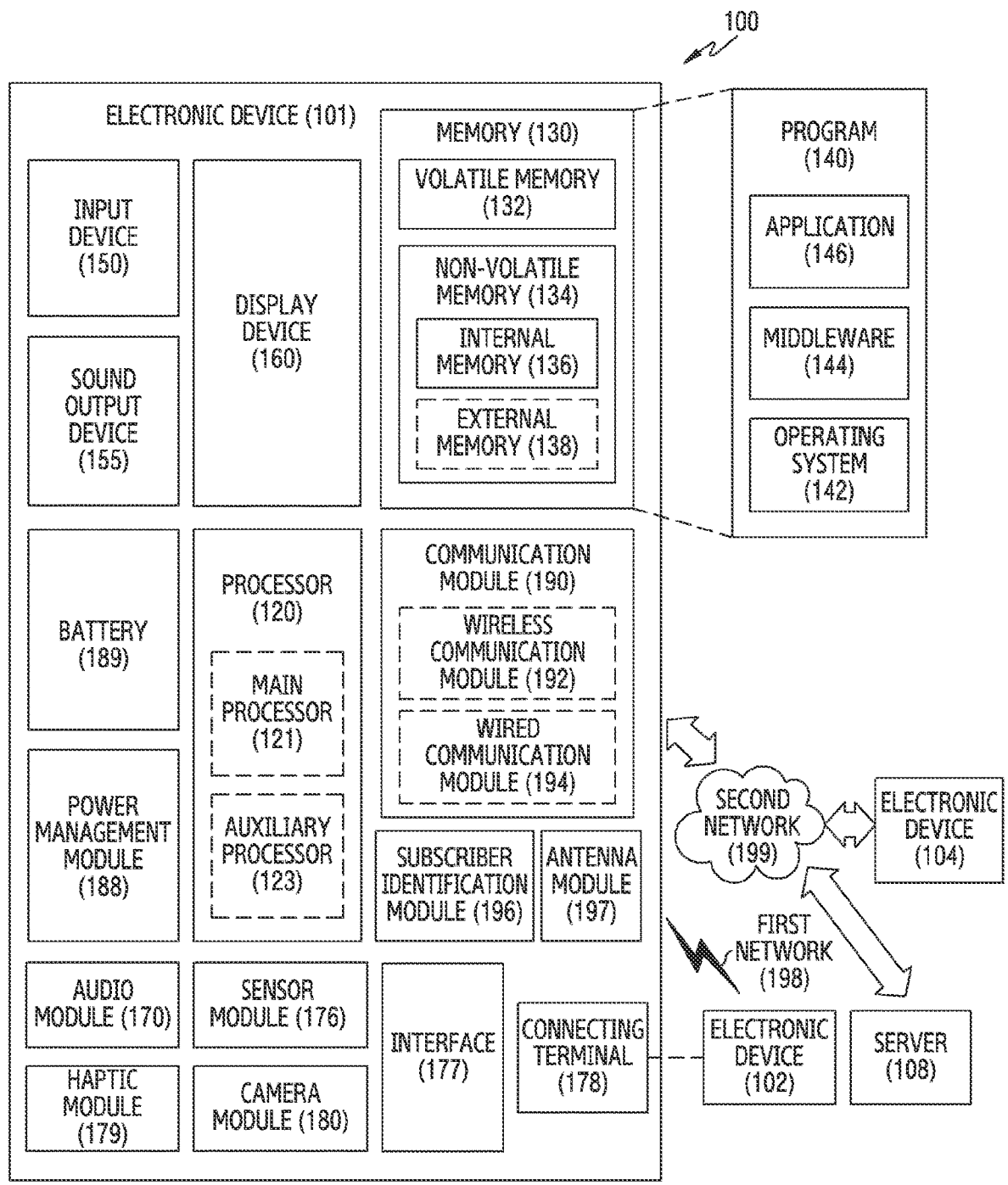
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
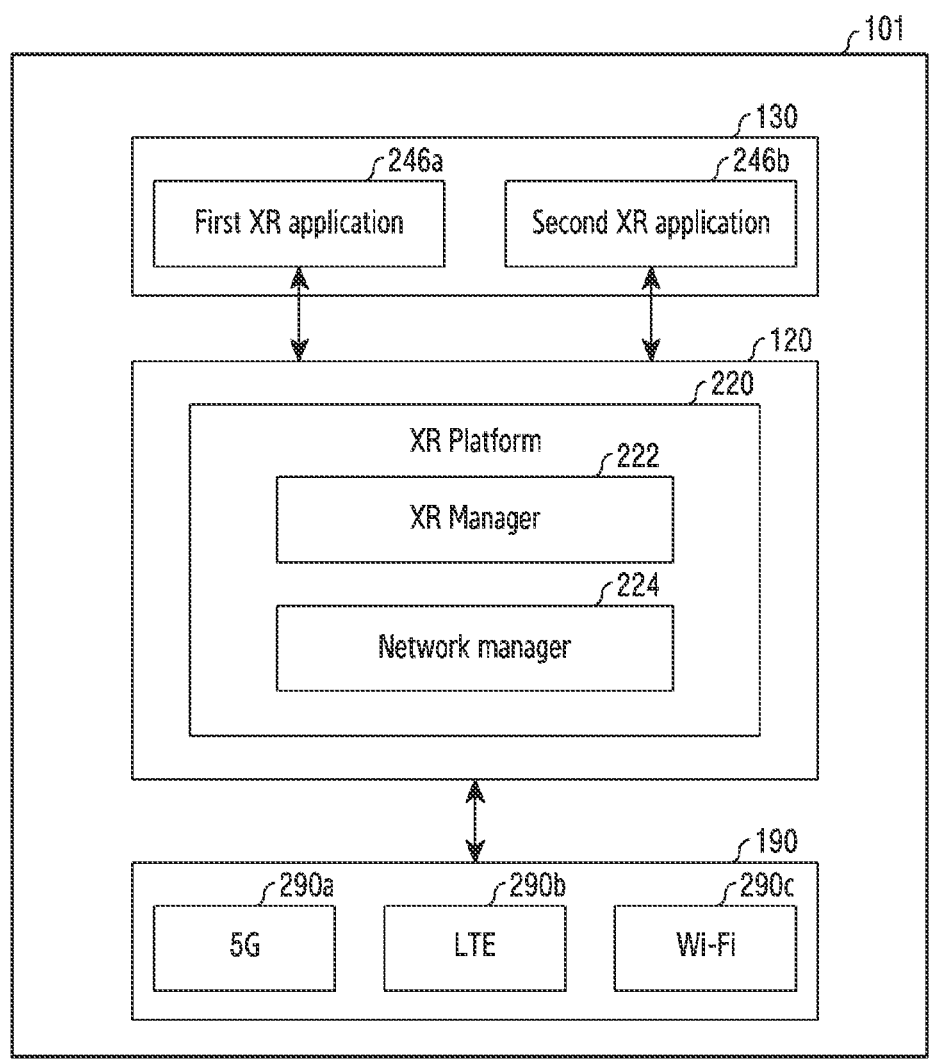
FIG. 2 is a block diagram illustrating an example configuration of an electronic device for providing an extended reality (XR) service according to various embodiments.

FIG. 2 is a block diagram illustrating an example configuration of the electronic device 101 for providing an extended reality (XR) service according to various embodiments. The configuration of FIG. 2 may be understood as the configuration of a part of the electronic device 101.

Referring to FIG. 2, the electronic device 101 may include the processor 120, the memory 130, and/or the communication module 190. The processor 120 may include an XR platform 220. The XR platform 220 may include an XR manager 222 and/or a network manager 224. The communication module 190 may include a 5G module 290*a*, an LTE module 290*b*, and/or a wireless fidelity (Wi-Fi) module 290*c*.

According to various embodiments, the XR platform 220 may perform control related to an XR service. According to an embodiment, if a first XR application 246*a* or a second XR application 246*b* is executed, candidate in-play servers may be determined based on the quality of service (QoS) of each in-play server that provide an XR service. According to an embodiment, if an XR service is received from an XR in-play server determined among the candidate in-play servers, the XR platform 220 may control a communication connect in real time according to a change of QoS required, in order to satisfy the QoS required by the XR application 246a or 246b that is currently executed. The XR platform 220 may perform filtering so as to obtain data for the XR application 246a or 246b among data received via a plurality of communication connections or bearers while the XR service is performed, and may transfer the filtered data to the XR application 246a or 246b.

According to an embodiment, the XR manager 222 may receive a QoS change request from the XR application 246a or 246b while providing the XR service, and may perform control so as to establish a communication connection to secure a changed QoS. According to an embodiment, in order to determine candidate in-play servers, the XR manager 222 may obtain information associated with XR in-play servers from the XR access server 108, and may measure QoS for each of the XR in-play servers for each communication scheme. For example, the XR manager 222 may obtain QoS information for each of the communication schemes of the XR in-play servers via communication schemes supportable by the electronic device 101, such as LTE, 5G, Wi-Fi, or wideband code division multiple access (WCDMA).

According to various embodiments, the network manager 224 may control the communication module 190 for an XR service. According to an embodiment, the network manager 224 may control the communication module 190 to receive an XR service using a communication connection determined by the XR manager 222 in response to a QoS change request received while the XR service is provided. For example, if the XR manager 222 determines to change a communication connection from LTE to 5G in response to a QoS change request, the network manager 224 may perform control so that the communication module 190 performs 5G communication. According to an embodiment, the network manager 224 may control the communication module 190 to sequentially change a communication scheme in order to measure QoS for each of the in-play servers. For example, if the XR manager 222 determines to measure QoS, the network manager 224 may sequentially activate communication schemes, such as, LTE, 5G, Wi-Fi, and the like, for an in-play server, so as to transmit a signal for the measurement of QoS.

Although FIG. 2 illustrates that the first XR application 246a and the second XR application 246b are stored in the memory 130, the number of XR applications stored in the memory 130 may be one or three or more. Although FIG. 2 illustrates that the communication module 190 provides communication schemes of 5G 290a, LTE 290b, and Wi-Fi 290c, which is merely an example, the communication module 190 may support various communication schemes which are not limited to the example of FIG. 2.

Figure 3:
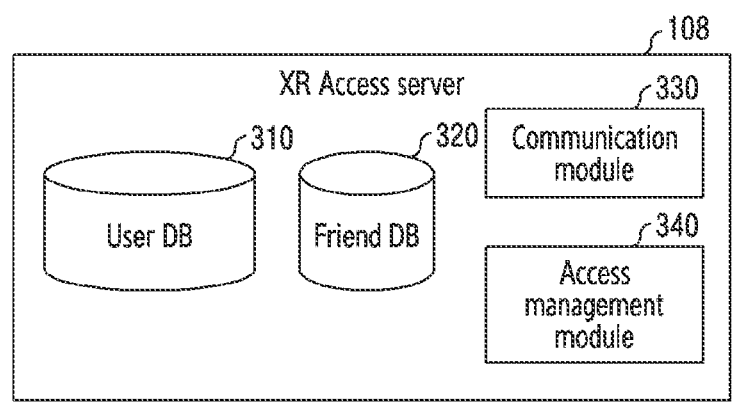
FIG. 3 is a block diagram illustrating an example configuration of an XR access server device for providing an XR service according to various embodiments.

FIG. 3 is a block diagram illustrating an example configuration of an XR access server device for providing an XR service according to various embodiments. The configuration of FIG. 3 may be understood as the configuration of a part of the server 108. Referring to FIG. 3, the XR access server 108 may include a user database (DB) 310, a friend DB 320, a communication module (e.g., including communication circuitry) 330, and/or an access management module (e.g., including various processing circuitry and/or executable program instructions) 340. The user DB 310 may store user related information received from a plurality of electronic devices including the electronic device 101. For example, the user related information such as the list of candidate in-play servers or the QoS of each of the candidate in-play servers stored for each user in the user DB 310 may be used when the XR access server 108 groups users. The friend DB 320 may store information related to users of electronic devices that are registered by a user as friends, and may be used when the XR access server 108 performs grouping. For example, the XR access server 108 may group the users registered with the friend DB 320, so as to determine to access an XR in-play server. The communication module 330 may be configured to be identical to the communication module 190. The access management module 340 may perform grouping by determining an XR in-play server and electronic devices to access the corresponding XR in-play server, based on the data of the user DB 310 or friend DB 320. For example, the access management module 340 may allocate N users in order of the highest QoS for each XR in-play server, using QoS measured for each XR in-play server and information associated with candidate in-play servers determined based on the measured QoS, for each user. The N users may access the allocated XR in-play server via a communication scheme in which the users have the highest measured QoS.

Figure 4:
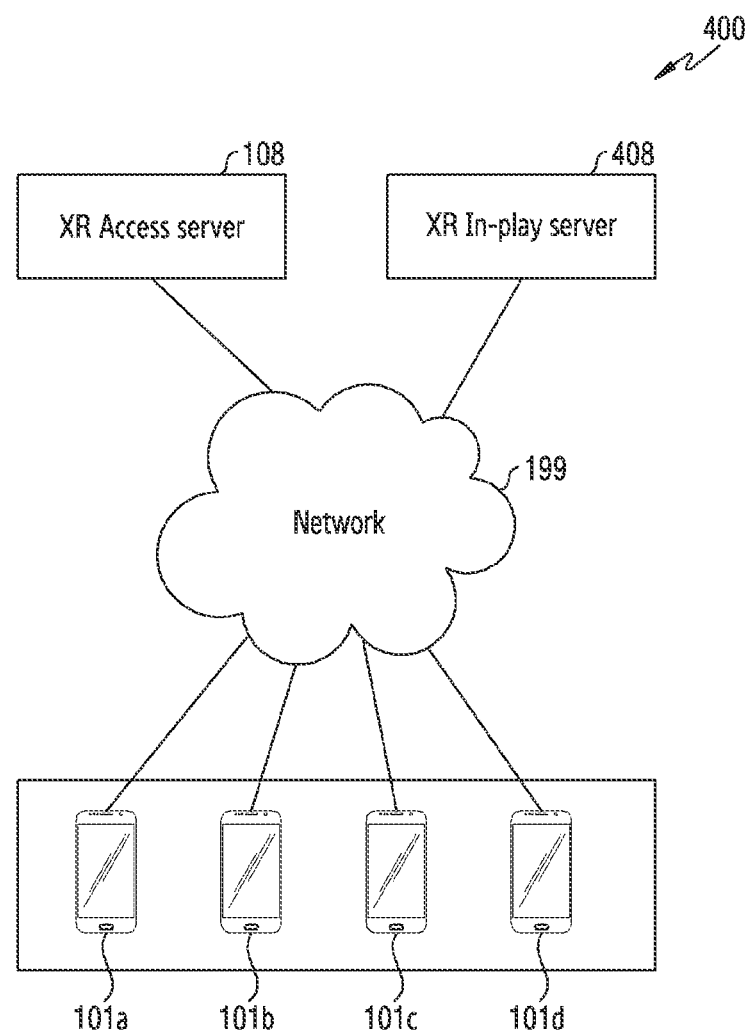
FIG. 4 is a diagram illustrating an example of a system for providing an XR service according to various embodiments.

FIG. 4 is a diagram illustrating an example of a system 400 for providing an XR service according to various embodiments. FIG. 4 illustrates the system 400 including the server 108 that performs a role of the XR access server of FIG. 3, electronic devices 101a, 101b, 101c, and 101d configured as illustrated in FIG. 2, an XR in-play server 408 for providing an XR service to the electronic devices 101a, 101b, 101c, and 101d, and/or the network 199 of FIG. 1.

Referring to FIG. 4, upon execution of an XR application, the electronic devices 101a, 101b, 101c, and 101d may access the XR access server 108 in order to receive an XR service. The XR access server 108 may determine whether to grand access for each of the electronic devices 101a, 101b, 101c, and 101d, and may transmit a result associated with whether access is granted, or may transmit information associated with XR in-play servers to the electronic devices 101a, 101b, 101c, and 101d via the network 199. If the electronic devices 101a, 101b, 101c, and 101d receive the information associated with the XR in-play servers, the electronic devices may measure QoS for each of the XR in-play servers, for each communication scheme using the network 199. The server 108 may determine a group including at least one electronic device which is to access each XR in-play server, among the electronic devices 101a, 101b, 101c, and 101d, based on the list of candidate in-play servers and a QoS measurement result of each of the electronic devices 101a, 101b, 101c, and 101d.

The XR in-play server 408 may be a server to which users of the electronic device 101a, 101b, 101c, and 101d access in order to use an XR service, and may provide data and/or information needed for the XR service to the electronic devices 101a, 101b, 101c, and 101d, in real time. According to various embodiments, the XR in-play server 408 may be implemented as a multi access edge computing (MEC) for supporting a low-latency service. The MEC server is disposed nearby a base station, thereby providing a latency lower than that of transmission or reception between network ends. If a communication connection is established with the XR in-play server 408 via a cellular network, the electronic devices 101a, 101b, 101c, and 101d may receive an XR service of which a latency time for data is minimized and/or reduced. Each of the electronic devices 101a, 101b, 101c, and 101d may establish a communication connection that provides QoS measured to determine candidate in-play servers, and may perform initial access to the XR in-play server 408.

According to various embodiments, while an XR service is being provided, XR applications that are executed in the electronic devices 101*a*, 101*b*, 101*c*, and 101*d* may request QoS higher than the current QoS, depending on the situation. The electronic devices 101*a*, 101*b*, 101*c*, and 101*d* may additionally or alternatively establish communication connections that support higher QoS, and may exchange data needed for providing the XR service with the XR in-play server 408 via the network 199. According to various embodiments, the electronic devices 101*a*, 101*b*, 101*c*, and 101*d* may perform control in real time so that additional communication connections are enabled according to a change of QoS required by XR applications, and thus, may perform low-latency communication with the XR in-play server 408. For example, in the case in which an XR first person shooting game is provided, if the distance between users is far from each other, the probability of interaction between the users is low, and thus, a high latency performance and/or low latency time may not be required. Conversely, if the distance between users is close, the probability of interaction between the users is high, a high latency performance and/or low latency time may be required. As another example, in a location where a static location-based XR service is capable of being provided by downloading data in advance, a high latency performance and/or a low latency time may not be required. Conversely, in a location where a location-based XR service needs to be dynamically performed by transmitting or receiving data in real time, a high latency performance and/or low latency time may be required. The XR in-play server 408 may provide information related to QoS to the electronic devices 101*a*, 101*b*, 101*c*, and 101*d* in real time, and may assist controlling communication connections of the electronic devices 101*a*, 101*b*, 101*c*, and 101*d*.

According to various example embodiments of the disclosure, an electronic device (e.g., the electronic device 101) may include: an XR application (e.g., the first XR application 246*a* and the second XR application 246*b*), a transceiver (e.g., the communication module 190), and at least one processor (e.g., the processor 120) operatively coupled with the XR application and the transceiver, and the at least one processor is configured to: establish a first communication connection corresponding to a first value to receive data associated with an XR service from an XR server (e.g., the XR in-play server 408) based on the first value of QoS required by the XR application, maintain the first communication connection and establish a second communication connection corresponding to a second value based on a change of the QoS from the first value to the second value, and receive data associated with the XR service from the XR server via the second communication connection, wherein the second communication connection may include one of radio access technology (RAT) different from that of the first communication connection or a bearer different from that of the first communication connection.

According to various example embodiments, in order to maintain the first communication connection and to establish the second communication connection corresponding to the second value based on the change of the QoS from the first value to the second value, the at least one processor (e.g., the processor 120) may be further configured to: establish one of LTE or 5G as the second communication connection based on the first communication connection being set to Wi-Fi, and configure the second communication connection with a second bearer of the LTE or 5G system based on the first communication connection being configured with a first bearer of an LTE or 5G system.

According to various example embodiments of the disclosure, the at least one processor (e.g., the processor 120) may be further configured to: identify that the QoS is changed to a third value greater than the first value and less than the second value, disconnect the second communication connection, establish a third communication connection corresponding to the third value, and maintain the first communication connection and receive data associated with the XR service from the XR server (e.g., the XR in-play server 408) via the third communication connection.

According to various example embodiments of the disclosure, the QoS may include at least one of a latency time, whether connection to the XR server (e.g., the XR in-play server 408) is available, or a throughput.

According to various example embodiments of the disclosure, the at least one processor (e.g., the processor 120) may be further configured to: receive, from an access server (e.g., the XR access server 108), information associated with a plurality of XR servers (e.g., XR in-play servers 1004) including the XR server (e.g., the XR in-play server 408), measure QoS for each of the plurality of XR servers based on the information associated with the plurality of XR servers, determine candidate XR servers among the plurality of XR servers based on the QoS measured for each of the plurality of XR servers, and join a group associated with the XR server determined by the access server among the candidate XR servers, to access the XR server.

According to various example embodiments of the disclosure, to measure QoS for each of the plurality of XR servers based on information associated with the plurality of XR servers (e.g., the XR in-play servers 1004), the at least one processor (e.g., the processor 120) may be further configured to measure QoS for each RAT supported by the electronic device (e.g., the electronic device 101), for each of the plurality of XR servers.

According to various example embodiments of the disclosure, the at least one processor (e.g., the processor 120) may be further configured to: receive, from an access server (e.g., the XR access server 108), a list including information associated with first candidate XR servers determined by another electronic device, measure QoS for each of the first candidate XR servers based on the information associated with the first candidate XR servers, determine second candidate XR servers among the first candidate XR servers, based on QoS measured for each of the first candidate XR servers, and join a group associated with the XR server (e.g., the XR in-play server 408) determined by the access server among candidate XR servers including the first candidate XR servers and the second candidate XR servers, to access the XR server.

According to various example embodiments of the disclosure, to measure the QoS for each of the first candidate XR servers based on the information associated with the first candidate XR servers, the at least one processor (e.g., the processor 120) may be configured to measure QoS for each RAT supported by the electronic device (e.g., the electronic device 101), for each of the first candidate XR servers.

According to various example embodiments, the electronic device (e.g., the electronic device 101) may be an electronic device which is expected, by the access server (e.g., the XR access server 108), to be within a specified proximity to the other electronic device from the perspective of a network.

According to various example embodiments, an XR access server device (e.g., the XR access server 108) may include: a transceiver (e.g., the communication module 330) and at least one processor (e.g., the access management module 340) operatively coupled with the transceiver, and the at least one processor is configured to: receive a group making request including the list of first candidate XR servers of a first electronic device from the first electronic device (e.g., the first electronic device 101a), transmit a first group join request including the list of the first candidate XR servers to at least one second electronic device (e.g., the second electronic device 101b) in response to the group making request, receive, from the second electronic device, a second group join request including the list of the second candidate XR servers which is at least a part of the first candidate XR servers, and determine an XR server (e.g., the XR in-play server 408) among the candidate XR servers including the first candidate XR servers and the second candidate XR servers and electronic devices which are to join a group associated with the XR server. The at least one second electronic device may include an electronic device expected to be within a specified proximity to the first electronic device from the perspective of a network.

Figure 5:
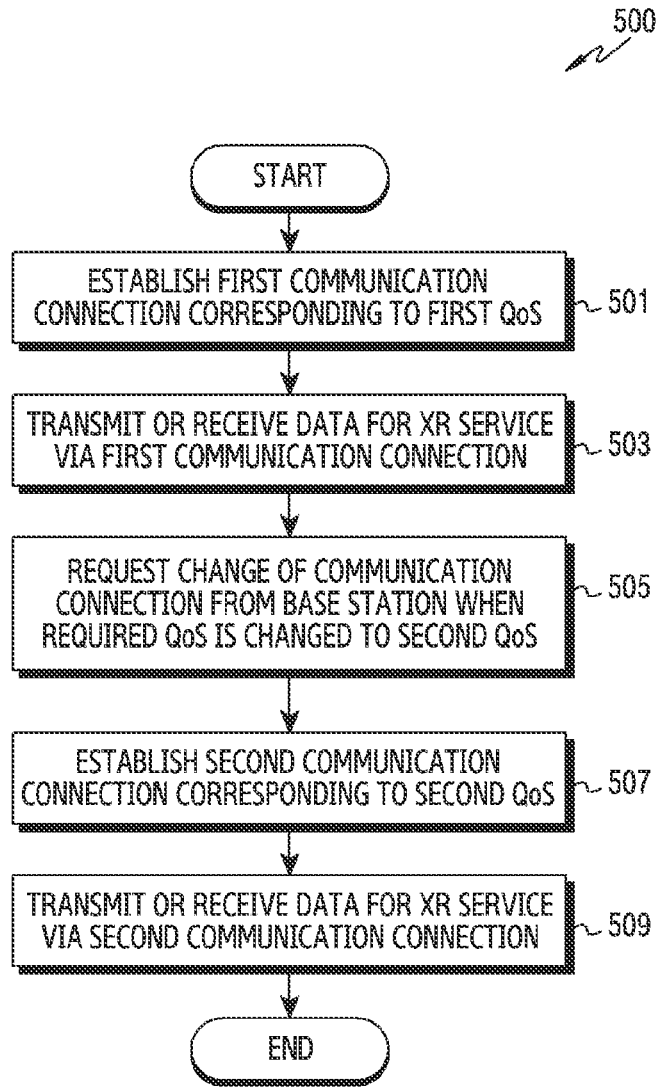
FIG. 5 is a flowchart illustrating an example process of controlling a communication connection of an XR service, by an electronic device according to various embodiments.

FIG. 5 is a flowchart 500 illustrating an example process of controlling a communication connection of an XR service, by an electronic device according to various embodiments. A subject that operates according to the flowchart 500 of FIG. 5 may be understood as the electronic device 101 or an element (e.g., the processor 120) of the electronic device 101.

Referring to FIG. 5, in operation 501, the electronic device 101 (e.g., the processor 120) may establish a first communication connection corresponding to a first QoS. The electronic device 101 may identify information associated with the first QoS which is a basic QoS needed for receiving an XR service corresponding to an executed XR application (e.g., the first XR application 246a or the second XR application 246b). According to an embodiment, the XR application may transmit the first QoS information required for provision of the XR service to an XR platform (e.g., the XR platform 220). The electronic device 101 may select a communication network capable of providing the first QoS, and may establish the first communication connection corresponding to the first QoS. If it is determined that the XR service is capable of being reliably provided via a Wi-Fi connection since the first QoS required by the XR application is low, the electronic device 101 may select a Wi-Fi connection as the first communication connection. If the first QoS required by the XR application is a value that does not allow reliable provision of the XR service via a Wi-Fi connection, the electronic device 101 may select an LTE connection or a 5G connection as the first communication connection. If the electronic device 101 selects the LTE connection or the 5G connection, the electronic device 101 may select a bearer capable of providing the first QoS, and may request a base station to configure the bearer.

In operation 503, the electronic device 101 may transmit and/or receive data for the XR service via the first communication connection. If the electronic device 101 selects a Wi-Fi connection as the first communication connection, the electronic device 101 may receive the XR service until the QoS required by the XR application is changed. If the electronic device 101 selects an LTE connection or a 5G connection as the first communication connection, the electronic device 101 may receive the XR service via a configured bearer until the QoS required by the XR application is changed. According to various embodiments, the first communication connection established by the electronic device 101 may be referred to as a basic communication connection or an essential bearer, and the first communication connection may be maintained until the XR service is terminated.

In operation 505, the electronic device 101 may request the base station to change the communication connection when the required QoS is changed to a second QoS. The electronic device 101 may identify that the QoS required by the XR application is changed from the first QoS to the second QoS while providing the XR service. The QoS required by the XR application may be changed in real time depending on the context of the XR service. According to various embodiments, the XR application may identify internal context information of the XR service such as an XR game, and may determine whether to establish a new communication connection and/or may configure a new bearer. For example, while an XR first person shooting game is executed, if the distance between users in the game becomes closer, a quick reaction speed is required. Accordingly, the XR service may need to be provided with a low latency time. The XR application may identify that the distance between the users becomes closer based on the context information of the XR game which is being executed, and may determine that QoS which is higher than the current QoS is needed. For example, the XR application may identify the distance between user-XR in-play server-user based on a data delivery time between the user-XR in-play server-user, and may determine to change the QoS. The XR application may obtain information associated with a plurality of distance ranges in association with the distance between the user-XR in-play server-user and information associated with QoS corresponding thereto, in advance, and may determine to change the QoS to QoS corresponding to a range to which the identified distance belongs to. The electronic device 101 may request the base station to change the communication connection in order to establish a communication connection that secures the second QoS which is higher than the first communication connection that operates as a basic communication connection. According to various embodiments, the change of the communication connection may include a change of radio access technology (RAT) or a change of a bearer in the same communication scheme. For example, if the first communication connection is a Wi-Fi connection, the electronic device 101 may request access from the base station in order to change RAT to an LTE connection or a 5G connection that is capable of providing the second QoS. If the first communication connection is an LTE connection or a 5G connection, the electronic device 101 may maintain the communication scheme and may request the base station to configure a new bearer that secures the second QoS which is higher than before. According to various embodiments, the change of the required QoS may be transferred from the XR application to the XR platform 220, and the XR platform 220 may control the communication connection based on the second QoS.

In operation 507, the electronic device 101 may establish a second communication connection corresponding to the second QoS. According to various embodiments, the electronic device 101 may maintain the first communication connection, and may additionally or alternatively establish the second communication connection that provides the second QoS which is higher than before. For example, if the first communication connection is a Wi-Fi connection, the electronic device 101 may maintain the W-Fi connection, and may request access from the base station via an LTE connection or a 5G connection. If a first bearer of an LTE connection or a 5G connection is configured as the first communication connection, the electronic device 101 may maintain the first bearer and may request the base station to additionally configure a second bearer that satisfies the second QoS.

In operation 509, the electronic device 101 may transmit and/or receive data for the XR service via the second communication connection. The electronic device 101 may use the XR service via the second communication connection until the QoS required by the XR application is changed. For example, if the first communication connection is a Wi-Fi connection, and an LTE connection or a 5G connection is determined as the second communication connection, the electronic device 101 may simultaneously maintain the Wi-Fi connection and the LTE connection or 5G connection, and may receive the XR service from the XR in-play server 408 via the LTE connection or 5G connection. If a first bearer of an LTE connection or 5G connection is determined as the first communication connection and a second bearer of the same LTE connection or 5G connection is determined as the second communication connection, the electronic device 101 may simultaneously maintain the first bearer and the second bearer and may receive the XR service from the XR in-play server 408 via the second bearer.

According to various embodiments, operations 505, 507 and 509 may be repeatedly performed by the electronic device 101. For example, if the distance between the users in the game becomes distant again, a second QoS which is higher than the first QoS and lower than the previously required second QoS may be required. The electronic device 101 may maintain the LTE connection or 5G connection determined as the second communication connection, and may request the base station to release the previously configured bearer and to configure a new bearer which is capable of satisfying the newly required second QoS (e.g., operation 505). The electronic device 101 may maintain the first communication connection that is established at the initial stage, and may use the XR service (e.g., operation 509) using the newly established second communication connection (e.g., operation 507). As another example, if the second QoS required by the XR application is changed to be less than or equal to the first QoS and the previously required second QoS since the distance between the users in the game becomes distant again, the electronic device 101 may request the base station to change, based on the newly required second QoS, the communication connection (e.g., operation 505). The electronic device 101 may establish the connection corresponding to the first communication connection as the second communication connection (e.g., operation 507). The electronic device may use the XR service via the second communication connection which is identical to the first communication connection (e.g., operation 509). In this instance, the communication connection based on the previously required second QoS may be released, and the service may be provided only via the first communication connection.

As described above, by controlling a communication connection in real time based on a change of QoS, the electronic device 101 may support QoS required by an XR application via the minimum and/or reduced amount of radio resources required for using the XR service. A user may not always need to maintain an LTE connection or 5G connection or a bearer supporting a high latency performance, while using the XR service, and thus, communication costs associated with the use of a bearer may be reduced. Network operators may reduce the amount of radio resources allocated for maintaining a bearer that provides a high quality of QoS.

Figure 6:
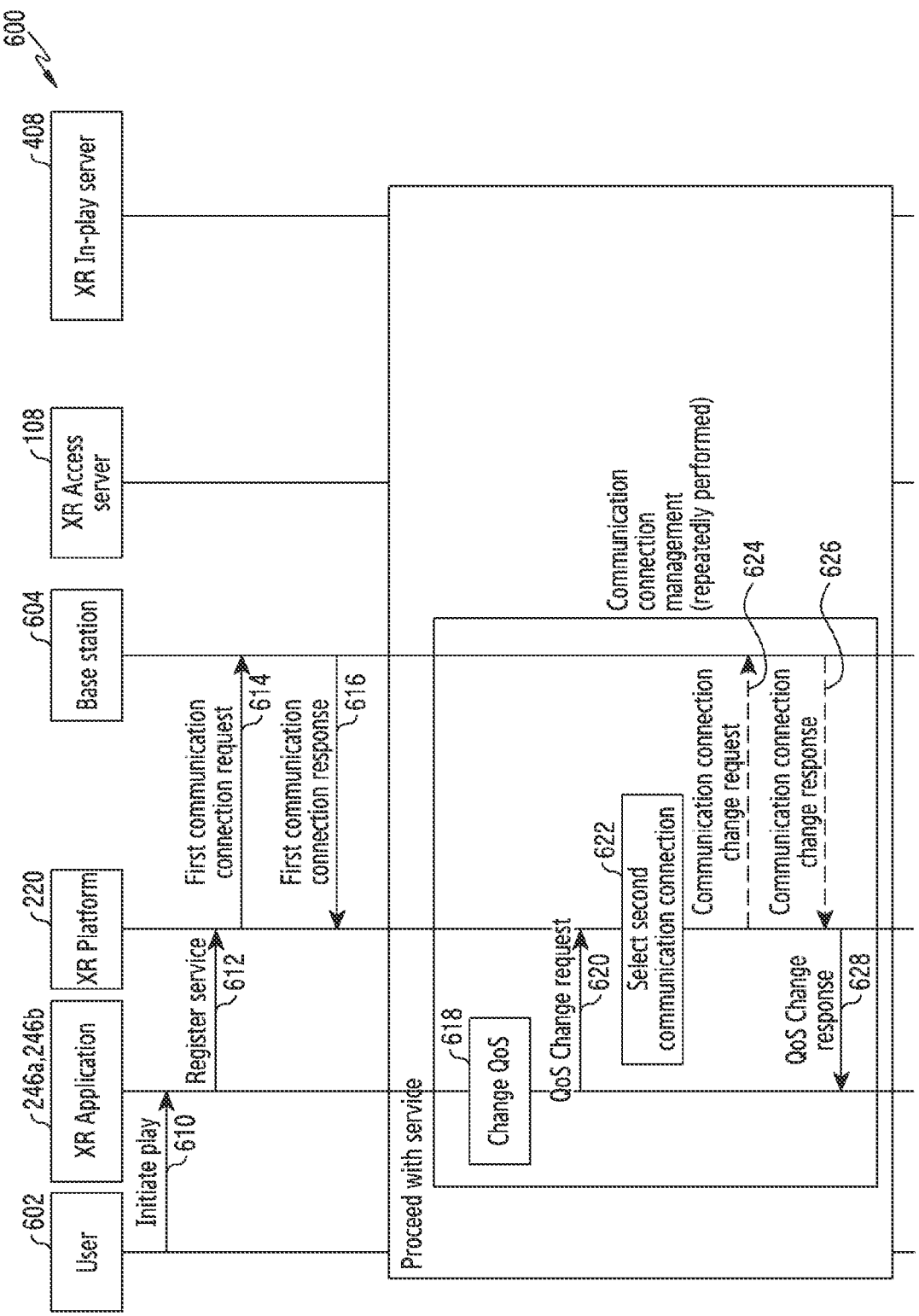
FIG. 6 is a signal flow diagram illustrating example signal exchange for controlling a communication connection of an XR service according to various embodiments.

FIG. 6 is a signal flow diagram 600 illustrating example signal exchange for controlling a communication connection of an XR service according to various embodiment. The signal exchange diagram 600 of FIG. 6 may be understood as the flow of signals exchanged between the electronic device 101 and a base station 604.

Referring to FIG. 6, in operation 610, a user 602 of the electronic device 101 may execute an XR application (e.g., the first XR application 246*a* or the second XR application 246*b*), after the XR in-play server 408 to provide an XR service and the user of the electronic device 101 who is to receive a service from the XR in-play server 408 are selected. For example, the electronic device 101 may execute an XR application that provides an XR shooting game service.

In operation 612, the XR application may transmit information associated with a first QoS which is a basic QoS needed for receiving an XR service to the XR platform 220 via "service registration". The XR platform 220 may select a first communication connection capable of providing the first QoS. For example, if it is determined that the XR service is reliably provided via a Wi-Fi connection since the first QoS required by the XR application is low, the XR platform 220 may select the Wi-Fi connection as the first communication connection. If it is determined that the first QoS is not capable of being reliably provided via a Wi-Fi connection, the XR platform 220 may select an LTE connection or 5G connection as the first communication connection.

In operation 614, the XR platform 220 may request, from the base station 604, the first communication connection corresponding to the first QoS. According to various embodiments, the base station 604 may be a base station that provides an LTE connection or 5G connection, or may be a device that provides a Wi-Fi connection. If a Wi-Fi connection is determined as the first communication connection, the XR platform 220 may request the base station 604 to provide the Wi-Fi connection at the first QoS. If an LTE connection or 5G connection is determined as the first communication connection, the XR platform 220 may request the base station 604 to provide a first bearer that provides the first QoS.

In operation 616, if a first communication connection response is transmitted from the base station 604 to the XR platform 220, the first communication connection may be established between the base station 604 and the electronic device 101. According to various embodiments, one of the various communication schemes, such as Wi-Fi, LTE, or 5G, may be established as the first communication connection depending on the level of the first QoS. The electronic device 101 may receive the XR service from the XR in-play server 408 via the first communication connection until the QoS required by the XR application is changed.

In operation 618, the XR application may identify that the QoS needs to be changed. According to various embodiments, the required QoS may be changed depending on the context of the XR service. For example, if an XR first person shooting game is provided and the distance between users becomes significantly close and interaction between the users occurs, the XR service with a significantly short latency time may be required. According to an embodiment, the XR application may identify the internal context of the XR service based on a result value (e.g., a data latency time) associated with communication between XR applications and the in-play server, and may determine that the QoS needs to be changed to a second QoS which is higher than the first QoS. According to an embodiment, the change of the required QoS may be determined by the XR in-play server based on the internal context of the XR service. The XR application may receive information associated with the change of the QoS from the XR in-play server, and may identify that the QoS needs to be changed.

In operation 620, the XR application may transmit a QoS change request to the XR platform 220. According to various embodiments, the QoS change request may include information related to the second QoS to which the QoS is to be changed.

In operation 622, the XR platform 220 may select a second communication connection based on the information associated with the second QoS included in the QoS change request. According to various embodiments, the XR platform 220 may select RAT different from that of the first communication connection, or may select a second communication connection that uses the same communication scheme as that of the first communication connection and has a different bearer. For example, the XR platform 220 may select, as the second communication connection, an LTE connection or 5G connection which is different RAT from Wi-Fi which is the first communication connection, or may select a second bearer different from a first bearer of the LTE connection or 5G connection which is the first communication connection, as the second communication connection.

In operation 624, the XR platform 220 may transmit a communication connection change request to the base station 604. The communication connection change request may be a signal for changing the communication connection for receiving the XR service from the first communication connection to the second communication connection corresponding to the second QoS. For example, if the first communication connection is a Wi-Fi connection, the communication connection change request may be a signal for requesting access from the base station in order to newly establish an LTE connection or a 5G connection. If the first communication connection is an LTE connection or a 5G connection, the communication connection change request may be a signal for requesting the base station to establish the second bearer that provides the second QoS.

In operation 626, if a communication connection change response is transmitted from the base station 604 to the XR platform 220, the second communication connection may be established. According to various embodiments, while providing the XR service, the XR platform 220 may maintain the first communication connection, and may perform control so as to newly establish or release the second communication connection, which is an additional communication connection, depending on a change of the QoS. For example, if the second QoS which is higher is required in the state in which only the first communication connection is present, the XR platform 220 may additionally establish the second communication connection. If QoS which is lower than the second QoS provided by the additionally established second communication connection is required, the XR platform 220 may release the second communication connection and may establish a new second communication connection.

In operation 628, if a QoS change response is transmitted from the XR platform 220 to the XR application, the establishment of the second communication is complete. The electronic device 101 may use the XR service via the second communication connection established in operations 618 to 626 until the QoS required by the XR application is changed again.

An embodiment related to controlling a communication connection illustrated in FIG. 6 may be repeatedly performed when the QoS required by the XR application is changed. Since a communication connection is established in real time, a communication connection that provides an XR service with a low latency time may be efficiently used.

In addition to controlling of a communication connection that provides an XR service, grouping of electronic devices in the stage of accessing an XR in-play server may effectively provide an XR service with a low latency. Hereinafter, an embodiment related to grouping will be described with reference to FIGS. 7 to 10.

Figure 7:
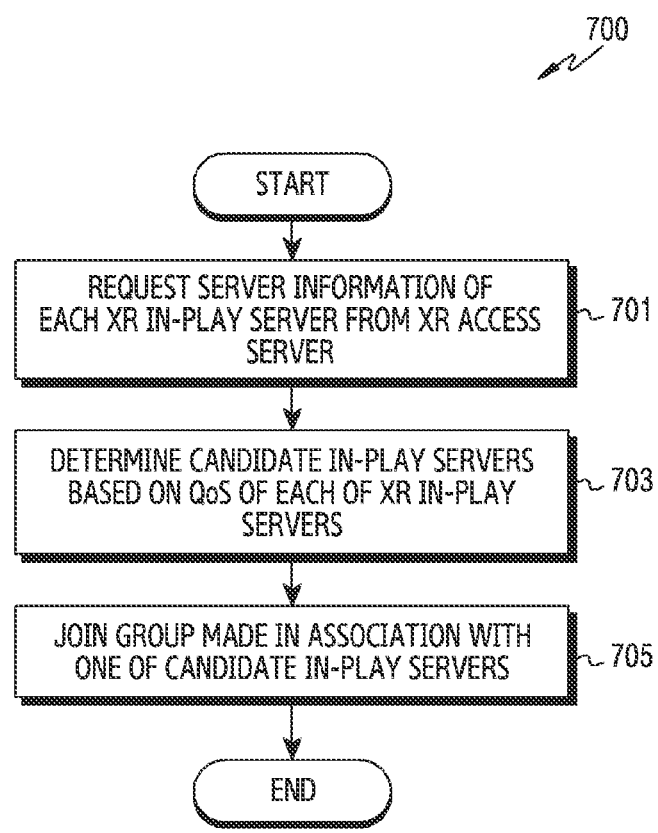
FIG. 7 is a flowchart illustrating an example process of joining a group associated with an XR in-play server, by an electronic device that requests making of a group according to various embodiments.

FIG. 7 is a flowchart 700 illustrating an example process of joining a group associated with an XR in-play server, by an electronic device that requests making of a group according to various embodiments. A subject that operates according to the flowchart 700 of FIG. 7 may be understood as the electronic device 101 or an element (e.g., the processor 120) of the electronic device 101.

Referring to FIG. 7, in operation 701, the electronic device 101 may request server information associated with XR in-play servers (e.g., the XR in-play server 408) from an XR access server (e.g., the server 108). According to various embodiments, the electronic device 101 may be an electronic device corresponding to a group leader that requests making of a group so as to make a group with other electronic devices and to use the XR service together. For example, a user of the electronic device 101 may desire to make a group so that the user can play an XR first person shooting game with users of other electronic devices in the same XR in-play server. The electronic device 101 may request, from the XR access server 108, connection information such as, internet protocol (IP) addresses of the plurality of XR in-play servers 408 or access keys. At least one XR in-play server of which connection information is provided to the electronic device 101 may be determined, by the XR access server 108, to be a server that is capable of making a group with other electronic devices based on location information of the electronic device 101.

In operation 703, the electronic device 101 may determine candidate in-play servers based on the QoS of each of the XR in-play servers. The electronic device 101 may measure QoS for each of the XR in-play servers using server information of the XR in-play servers received from the XR access server 108. According to various embodiments, the electronic device 101 may measure QoS for each communication scheme using communication schemes supportable by the electronic device 101, for each of the XR in-play servers 408. For example, the electronic device 101 may measure $QoS_{WiFi}$ which is QoS of Wi-Fi, $QoS_{LTE}$ which is QoS of LTE, and $QoS_{5G}$ which is QoS of 5G, for each XR in-play server. According to various embodiments, the electronic device 101 may measure QoS using a ping such as internet control message protocol (ICMP) or a transmission control protocol (TCP) connection. QoS may be measured for each bearer, and a QoS measurement result may differ depending on the type of communication scheme and/or a bearer used in the same communication scheme. The electronic device 101 may determine candidate in-play servers of which measured QoS are greater than or equal to QoS required by the XR application, among the XR in-play servers 408. According to an embodiment, the electronic device 101 may select a predetermined number of candidate in-play servers in order of the highest QoS measurement. According to another embodiment, the electronic device 101 may select candidate in-play servers by additionally taking into consideration communication fees per hour, communications fee per data capacity, or reliability of a communication connection in association with a communication scheme. The electronic device 101 may make a list including information associated with the determined candidate in-play servers, and may transmit the list to the XR access server 108.

In operation 705, the electronic device 101 may join a group made in association with one of the candidate in-play servers. The electronic device 101, together with other electronic devices, may be allocated to one of the candidate in-play servers, by the XR access server 108. According to various embodiments, when the electronic device 101 requests making of a group from the XR access server 108, it is determined that the electronic device 101 is to belong to an XR in-play server group, together with at least some of neighboring electronic devices that receive the group join request from the XR access server 108. According to various embodiments, the XR in-play server group may include electronic devices in order of the lowest latency time in association with the corresponding XR in-play server. The neighboring electronic devices that receive the group join request may be electronic devices that are physically close to the electronic device 101. The electronic devices which are to belong to the same XR in-play server group that the electronic device 101 belongs to may be electronic devices which are close to the electronic device 101 from the perspective of a network. Being close from the perspective of a network may be the network-based distance between user-server-user is close. For example, in FIG. 3, if the difference in latency time between the XR in-play server and each of electronic devices 101a, 101b, 101c, and 101d is small, it is understood that the electronic devices 101a, 101b, 101c, and 101d are close (e.g., within a specified proximity) from perspective of a network. The electronic device 101 may use the XR service with a low latency by accessing the same XR in-play server that other electronic devices close from the perspective of network access.

Figure 8:
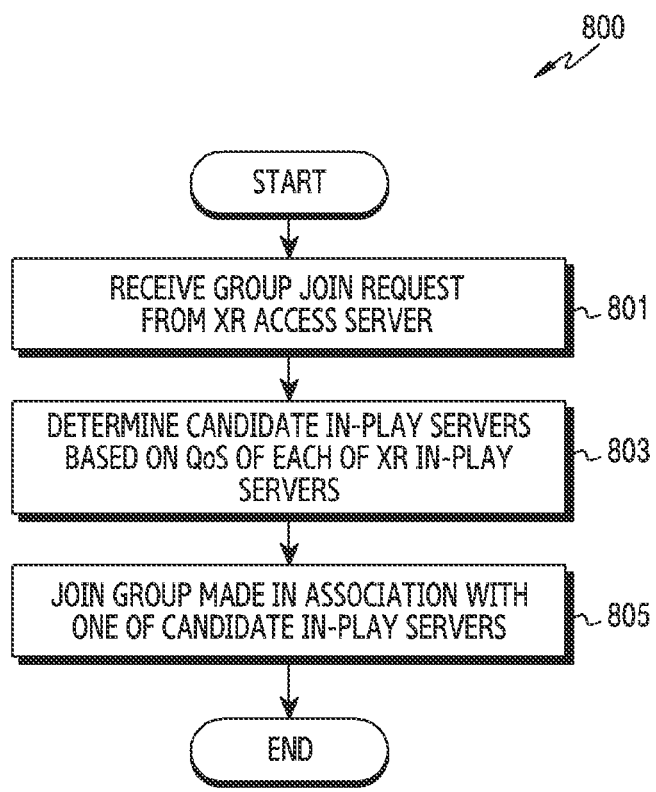
FIG. 8 is a flowchart illustrating an example process of joining a group associated with an XR in-play server, by an electronic device that receives a group join request according to various embodiments.

FIG. 8 is a flowchart 800 illustrating an example process of joining a group associated with an XR in-play server, by an electronic device that receives a group join request according to various embodiments. A subject that operates according to the flowchart 800 of FIG. 8 may be understood as the electronic device 101, one of the electronic devices 101a, 101b, 101c, 101d, or an element (e.g., the processor 120) of the electronic device 101.

Referring to FIG. 8, in operation 801, the electronic device 101 may receive a group join request from an XR access server (e.g., the server 108). According to various embodiments, the electronic device 101 may receive a group join request from the XR access server 108 when another electronic device corresponding to a group leader requests making of a group. At least one electronic device including the electronic device 101 may receive the group join request. According to an embodiment, based on location information of each of the electronic devices accessing the XR access server 108, at least one electronic device identified, by the XR access server 108, as being physically close to the location of the electronic device which is the group leader may receive the group join request. According to various embodiments, the group join request may include the list of candidate in-play servers determined by the electronic device which is the group leader.

In operation 803, the electronic device 101 may determine candidate in-play servers based on the QoS of each of the XR in-play servers. The electronic device 101 may measure QoS for each of the candidate in-play servers included in the list of the candidate in-play servers in the group join request. The candidate in-play servers determined by the group leader electronic device may be referred to as first candidate in-play servers. According to various embodiments, the electronic device 101 may measure QoS for each communication scheme using communication schemes supportable by the electronic device 101, for each of the first candidate XR in-play servers. For example, the electronic device 101 may measure $QoS_{WiFi}$ which is QoS of Wi-Fi, $QoS_{LTE}$ which is QoS of LTE, and $QoS_{5G}$ which is QoS of 5G, for each of the first candidate in-play server. In the case of a cellular communication scheme such as LTE or 5G, QoS may be measured for each of supportable bearers. The electronic device 101 may determine candidate in-play servers of which measured QoS are greater than or equal to a required QoS among the first candidate in-play servers. The candidate in-play servers determined by the electronic device 101 may be referred to as second candidate in-play servers. According to an embodiment, the electronic device 101 may select a predetermined number of second candidate in-play servers in order of the highest QoS measurement. According to another embodiment, the electronic device 101 may select the second candidate in-play servers by additionally taking into consideration communication fees per hour, communication fees per data capacity, or reliability of a communication connection in association with a communication scheme. The electronic device 101 may make a list including information associated with the second candidate in-play servers, and may transmit the list to the XR access server 108.

In operation 805, the electronic device 101 may join a group made in association with one of the candidate in-play servers. The electronic device 101, together with other electronic devices, may be allocated to one of the second candidate in-play servers, by the XR access server 108. According to various embodiments, it is determined that the electronic device 101 are to belong to the same XR in-play server group which at least some of other electronic devices that receive the group join request from the XR access server 108 and/or a group leader electronic device belongs to. According to various embodiments, the XR in-play server group may include electronic devices in order of the lowest latency time in association with the corresponding XR in-play server. The electronic devices which are to belong to the same XR in-play server group that the electronic device 101 belongs to may be electronic devices which are close to the electronic device 101 from the perspective of a network. The electronic device 101 may use an XR service with a low latency by accessing the same XR in-play server that other electronic devices which are close from the perspective of network access.

Figure 9:
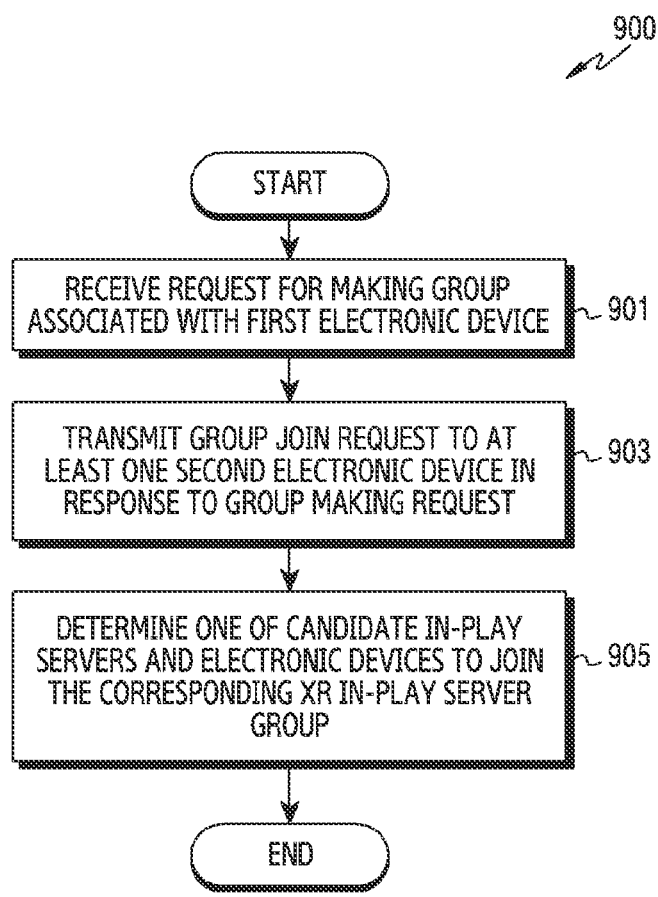
FIG. 9 is a flowchart illustrating an example process of determining an XR in-play server and a group of electronic devices for the XR in-play server, by an access server according to various embodiments.

FIG. 9 is a flowchart 900 illustrating an example process of determining an XR in-play server and a group of electronic devices for the XR in-play server, by an access server according to various embodiments. A subject that operates according to the flowchart 900 of FIG. 9 may understood as an XR access server (e.g., the server 108) or an element (e.g., the access management module 340) of the server 108.

Referring to FIG. 9, in operation 901, the XR access server 108 may receive a group making request from a first electronic device (e.g., the first electronic device 101a). According to various embodiments, the first electronic device 101a may be an electronic device corresponding to a group leader that requests making of a group in order to make a group with other electronic devices and to use an XR service together. The XR access server 108 may receive the list of candidate in-play servers determined by the first electronic device 101a, and the candidate in-play servers determined by the first electronic device may be referred to as first candidate in-play servers.

In operation 903, the XR access server 108 may transmit a group join request to at least one second electronic device (e.g., a second electronic device 101b, a third electronic device 101c, or a fourth electronic device 101d) in response to the group making request. The XR access server 108 may transmit the group join request (e.g., paging) to at least one second electronic device 101b, 101c, and 101d which is expected to be close to, from the perspective of a network, the first electronic device 101a which is a group leader. For example, by selecting the at least one second electronic device 101b, 101c, and 101d which are identified as being physically close to the location of the first electronic device 101a, the group join request may be transmitted. The group join request may include the list of the first candidate in-play servers determined by the first electronic device 101a. The XR access server 108 may receive the list of candidate in-play servers which is determined based on QoS which at least one second electronic device 101b, 101c, and 101d measures for each of the first candidate in-play servers, for each communication scheme. The candidate in-play servers determined by the at least one second electronic device 101b, 101c, and 101d may be referred to as second candidate in-play servers.

In operation 905, the XR access server 108 may determine one of the candidate in-play servers and electronic devices which are to join a group associated with the corresponding XR in-play server. According to various embodiments, the XR access server 108 may determine at least one XR in-play server to provide an XR service and at least one electronic device to access the corresponding XR in-play server by taking into consideration the candidate in-play server list obtained for each electronic device. For example, the XR access server 108 may select N electronic devices which are determined in advance in order of the lowest latency time, for each of the candidate in-play servers including the first candidate in-play servers and the second candidate in-play servers. The XR access server 108 may compare latency times of electronic devices, of which the latency times are the Nth lowest latency times for the respective candidate in-play servers. The XR access server 108 may select a candidate in-play server which an electronic device having the lowest latency time belongs to, among the electronic devices corresponding to the Nth lowest latency times, and may select electronic devices of a group allocated to the corresponding candidate in-play server. Via the above-described algorithm, the XR access server 108 may connect an XR in-play server and electronic devices which are close to each other from the perspective of a network. If the XR access server 108 selects an XR in-play server to provide an XR service and a group of electronic devices, the XR access server 108 may provide information (e.g., an IP address, an access key, or a group key) required for accessing the XR in-play server to the electronic devices which are to join the group.

Figure 10:
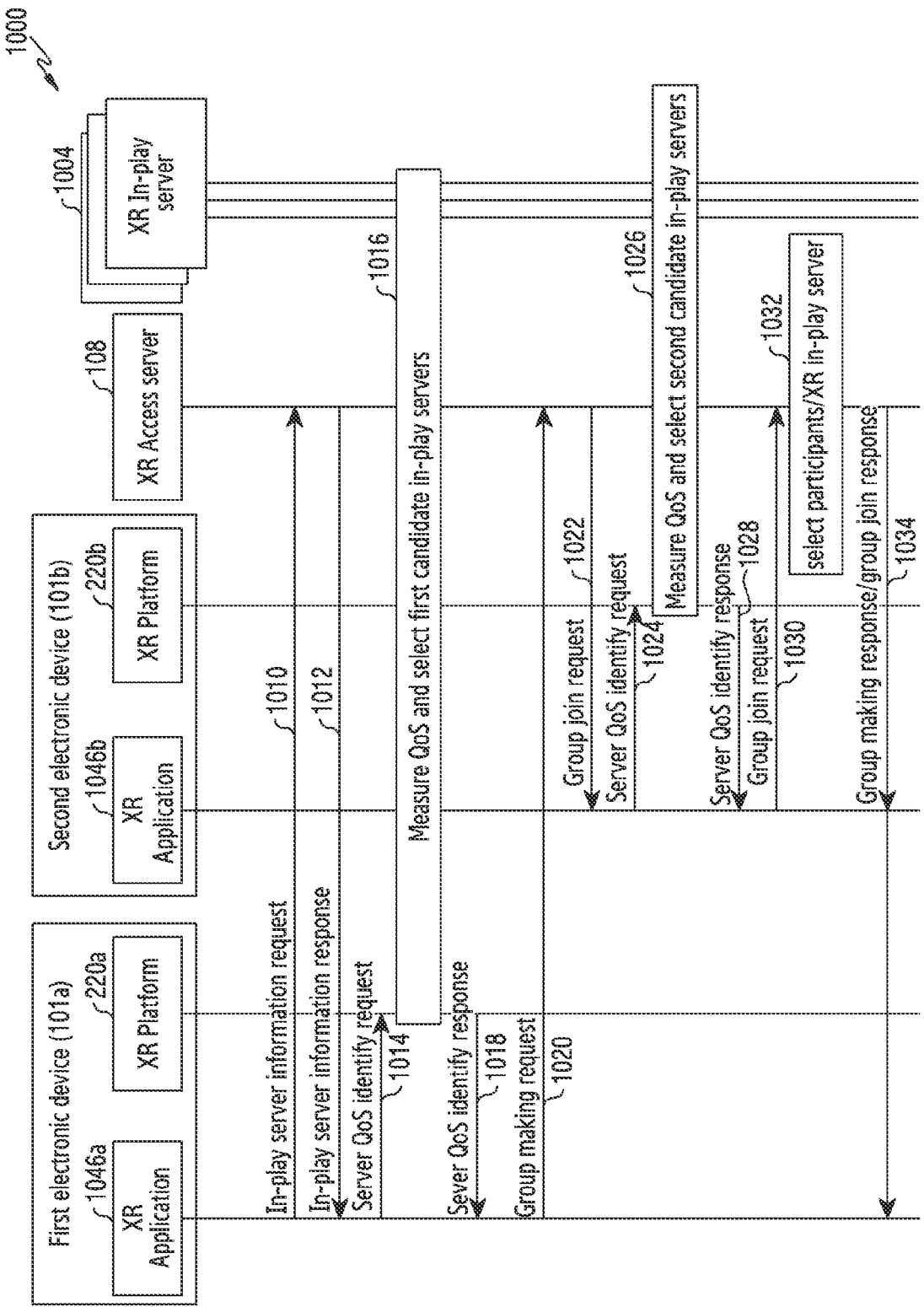
FIG. 10 is a signal flow diagram illustrating example signal exchange for determining an XR in-play server and a group of electronic devices for the XR in-play server, when accessing an XR service according to various embodiments.

FIG. 10 is a signal flow diagram 1000 illustrating example signal exchange for determining an XR in-play server and a group of electronic devices for the XR in-play server, when accessing an XR service according to various embodiments. The signal exchange diagram 1000 of FIG. 10 may be understood as the flow of signals exchanged among the first electronic device 101a, the second electronic device 101b, an XR access server (e.g., the server 108), and XR in-play servers 1004.

Referring to FIG. 10, in operation 1010, the first electronic device 101a may transmit an 'in-play server information request' for requesting information associated with the in-play servers 1004 from the XR access server 108. According to various embodiments, the first electronic device 101a may be an electronic device corresponding to a group leader that requests making of a group in order to make a group with other electronic devices and to use the XR service together. According to various embodiments, transmission of the 'in-play server information request' may be determined and controlled by an XR application (e.g., an XR application 1046a) of the first electronic device 101a.

In operation 1012, the XR access server 108 may transmit an 'in-play server information response' including information associated with at least one in-play server to the first electronic device 101a. According to various embodiments, the XR access server 108 may determine at least one in-play server for which a group may be capable of being made based on the location information of the first electronic device 101a which transmits the 'in-play server information request'. The XR access server 108 may transmit, to the first electronic device, the 'in-play server information response' including access information such as the IP address of the at least one determined XR in-play server, an access key, and the like. According to various embodiments, the 'in-play server information response' may be transmitted to the XR application in the first electronic device 101a.

In operation 1014, the XR application of the first electronic device 101a may transmit a 'server QoS identify request' to the XR platform 220. According to various embodiments, the 'server QoS identify request' may include at least one XR in-play server information received via the 'in-play server information response'. The XR application may request the XR platform 220a to measure QoS for the at least one XR in-play server included in the server QoS identify request. According to various embodiments, the QoS may include various performance-related indices, such as a latency time, whether access to a server is available, or a throughput.

In operation 1016, the XR platform 220a of the first electronic device 101a may measure QoS for the at least one XR in-play server included in the 'server QoS identify request', and may determine candidate in-play servers based on a measurement result. The QoS may be measured using a ping such as an ICMP, or using a TCP connection. The QoS may be measured differently depending on the type of communication scheme, or depending on a bearer used in the same communication scheme. The XR platform 220a may measure QoS for each of the at least one XR in-play server, using each of the communication schemes supported by the first electronic device 101a. For example, if the supportable communication schemes are Wi-Fi, LTE, and 5G, and LTE and 5G respectively provide two bearers, 5 QoS measurement results may be obtained for a single XR in-play server. According to various embodiments, measurement of QoS between the first electronic device 101a and the XR in-play server may be performed by the XR platform 220a which is capable of managing an XR service overall, instead of being implemented complexly by each XR application. The XR platform 220a may determine candidate in-play servers of which the measured QoS are greater than or equal to QoS required by the XR application among at least one XR in-play servers for which QoS are measured. According to an embodiment, the XR platform 220a may select a predetermined number of candidate in-play servers in order of the highest QoS measurement. According to another embodiment, the XR platform 220a may select candidate in-play servers by additionally taking into consideration communication fees per hour, communication fees per data capacity, or reliability of a communication connection in association with a communication scheme. If the candidate in-play servers are determined, the XR platform 220a may transmit a 'server QoS identify response' including the list of candidate in-play servers to the XR application in operation 1018.

In operation 1020, the XR application may transmit a 'group making request' to the XR access server 108, in order to make a group with other electronic devices and to access the XR in-play server. According to various embodiments, the 'group making request' may include the list of candidate in-play servers. The list of candidate in-play servers may be taken into consideration by the XR access server 108 in order to determine an XR in-play server to provide an XR service and electronic devices to be included in a group.

In operation 1022, the XR access server 108 may transmit, to an XR application of the second electronic device 101b, a 'group join request' for requesting making of a group with the first electronic device 101a and accessing the XR in-play server. The XR access server 108 may determine the second electronic device 101b which is expected to be close from the perspective of a network, based on information associated with each of the electronic devices accessing the XR access server 108, and may transmit the 'group join request (e.g., paging)'. For example, the XR access server 108 may transmit the 'group join request' to the second electronic device 101b which is identified as being physically close to the first electronic device 101a, based on the location information of each of the electronic devices. According to various embodiments, the 'group join request' may include the list of candidate in-play servers determined by the first electronic device 101a. The candidate in-play servers of the first electronic device 101a may be referred to as first candidate in-play servers, for ease of description.

In operation 1024, the XR application (e.g., the XR application 1046b) of the second electronic device 101b may transmit a 'server QoS identify request' to an XR platform 220b. According to various embodiments, the 'server QoS identify request' may include the list of the first candidate in-play servers received via the group join request. The XR application may request the XR platform 220b to measure QoS for the first candidate in-play servers included in the 'server QoS identify request'.

In operation 1026, the XR platform 220b of the second electronic device 101b may measure QoS for the first candidate in-play servers included in the 'server QoS identify request', and may determine candidate in-play servers for the second electronic device 101b based on a measurement result. The candidate in-play servers for the second electronic device 101b may be referred to as second candidate in-play servers. According to various embodiments, QoS measurement performed in operation 1026 may be performed in the same manner as operation 1016. The XR platform 220b may determine the second candidate in-play servers of which the measured QoS are greater than or equal to QoS required by the XR application among the first candidate in-play servers for which QoS are measured. According to an embodiment, the XR platform 220b may select a predetermined number of second candidate in-play servers in order of the highest QoS measurement. According to another embodiment, the XR platform 220b may select the second candidate in-play servers by additionally taking into consideration communication fees per hour, communication fees per data capacity, or reliability of a communication connection in association with a communication scheme. If the second candidate in-play servers are determined, the XR platform 220a may transmit a 'server QoS identify response' including the list of second candidate in-play servers to the XR application in operation 1028.

In operation 1030, the XR application may transmit a 'group join request' to the XR access server 108, in order to make a group with other electronic devices and to access the XR in-play server. According to various embodiments, the 'group join request' may include the list of second candidate in-play servers. The list of second candidate in-play servers may be taken into consideration by the XR access server 108 in order to determine an XR in-play server to provide an XR service and electronic devices to be included in a group.

In operation 1032, the XR access server 108 may determine (e.g., select) an XR in-play server to provide an XR service and electronic devices which are to join a group associated with the corresponding XR in-play server, among the candidate in-play servers determined by the electronic devices 101a and 101b. For example, the XR access server 108 may select N electronic devices which are determined in advance in order of the lowest latency time for each of the candidate in-play servers including the first candidate in-play servers and the second candidate in-play servers. The XR access server 108 may compare latency times of electronic devices, of which the latency times are the Nth lowest latency times for the respective candidate in-play servers. The XR access server 108 selects a candidate in-play server which an electronic device having the lowest latency time belongs to, among the electronic devices corresponding to the Nth lowest latency times, and may select electronic devices of a group allocated to the corresponding candidate in-play server. Via the above-described algorithm, the XR access server 108 may connect an XR in-play server and electronic devices which are close to each other from the perspective of a network.

If the XR in-play server to provide an XR service and a group of electronic devices are selected, the XR access server 108 may transmit a 'group making response' to the first electronic device 101a of which joining the group is determined, and may transmit a 'group join response' to the second electronic device 101b in operation 1034. According to various embodiments, the 'group making response' and/or 'group join response' may include information (e.g., an IP address, an access key, a group key, and the like) for accessing the selected XR in-play server. The first electronic device 101a and/or second electronic device 101b may access the selected XR in-play server based on the information for accessing the XR in-play server, which is received from the XR access server 108, and may receive the XR service.

According to various example embodiments, a method of operating an electronic device (e.g., the electronic device 101) may include: establishing a first communication connection corresponding to a first value to receive data associated with an extended reality (XR) service from an XR server (e.g., the XR in-play server 408) based on the first value of quality of service (QoS) required by an extended reality (XR) application (the first XR application 246a and the second XR application 246b) stored in the electronic device; based on a change of the QoS from the first value to a second value, maintaining the first communication connection and establishing a second communication connection corresponding to the second value; and receiving the data associated with the XR service from the XR server via the second communication connection, wherein the second communication connection includes one of radio access technology (RAT) different from that of the first communication connection or a bearer different from that of the first communication connection.

According to various example embodiments of the disclosure, the operation of maintaining the first communication connection and establishing of the second communication connection corresponding to the second value, based on the change of the QoS from the first value to the second value may include: establishing one of LTE or 5G as the second communication connection based on the first communication connection being set to Wi-Fi and an configuring the second communication connection with a second bearer of the LTE or 5G system based on the first communication connection being configured with a first bearer of an LTE or 5G system.

According to various example embodiments, the method of the electronic device (e.g., the electronic device 101) may further include: identifying that the QoS is changed to a third value greater than the first value and less than the second value, disconnecting the second communication connection, and establishing a third communication connection corresponding to the third value, and maintaining the first communication connection and receiving data associated with the XR service from the XR server (e.g., the XR in-play server 408) via the third communication connection.

According to various example embodiments, the QoS may include at least one of a latency time, whether connection to the XR server (e.g., the XR in-play server 408) is available, or a throughput.

According to various example embodiments, the method of operating the electronic device (e.g., the electronic device 101) may further include: receiving, from an access server (e.g., the XR access server 108), information associated with a plurality of XR servers including the XR server (e.g., the XR in-play server 408), measuring QoS for each of the plurality of XR servers (e.g., XR in-play servers 1004) based on the information associated with the plurality of XR servers, determining candidate XR servers among the plurality of XR servers based on the QoS measured for each of the plurality of XR servers, and joining a group associated with the XR server determined by the access server among the candidate XR servers, so as to access the XR server.

According to various example embodiments, the operation of measuring the QoS for each of the plurality of XR servers (e.g., XR in-play servers 1004) based on the information associated with the plurality of XR servers may further include measuring QoS for each RAT supported by the electronic device (e.g., the electronic device 101), for each of the plurality of XR servers.

According to various example embodiments, the method of operating the electronic device (e.g., the electronic device 101) may further include: receiving, from an access server (e.g., the XR access server 108), a list including information associated with first candidate XR servers determined by another electronic device, measuring QoS for each of the first candidate XR servers based on the information associated with the first candidate XR servers, determining second candidate XR servers among the first candidate XR servers based on the QoS measured for each of the first candidate XR servers, and joining a group associated with the XR server (e.g., the XR in-play server 408) determined by the access server among candidate XR servers including the first candidate XR servers and the second candidate XR servers, to access the XR server According to various example embodiments, the operation of measuring the QoS for each of the first candidate XR servers based on the information associated with the first candidate XR servers may include measuring QoS for each RAT supported by the electronic device (e.g., the electronic device 101), for each of the first candidate XR servers.

According to various example embodiments, the electronic device (e.g., the electronic device 101) may be an electronic device which is expected, by the access server (e.g., the XR access server 108), to be within a specified proximity to another electronic device from the perspective of a network.

According to various example embodiments, a method of operating an XR access server (e.g., the XR access server 108) may include: receiving a group making request including the list of first candidate XR servers of a first electronic device (e.g., the first electronic device 101a) from the first electronic device, transmitting a first group join request including the list of first candidate XR servers to at least one second electronic device (e.g., the second electronic device 101b) in response to the group making request, receiving a second group join request including the list of second candidate XR servers which are at least a part of the first candidate XR servers, determining a single XR server (e.g., the XR in-play server 408) among candidate XR servers including the first candidate XR servers and the second candidate XR servers, and determining electronic devices which are to join a group associated with the XR server. The at least one second electronic device may be an electronic device expected to be within a specified proximity to the first electronic device from the perspective of a network.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method of operating an electronic device, the method comprising:
    establishing a first communication connection corresponding to a first value of quality of service (QoS) to receive data associated with an extended reality (XR) service from an XR server, based on the first value of the QoS required by an extended reality (XR) application stored in the electronic device;
    based on a change of the QoS from the first value to a second value, maintaining the first communication connection and establishing a second communication connection corresponding to the second value;
    receiving the data associated with the XR service from the XR server via the second communication connection, wherein the second communication connection comprises one of radio access technology (RAT) different from the first communication connection or a bearer different from the first communication connection, the method further comprising:
    identifying that the QoS is changed to a third value greater than the first value and less than the second value;
    disconnecting the second communication connection, and establishing a third communication connection corresponding to the third value; and
    maintaining the first communication connection and receiving data associated with the XR service from the XR service via the third communication connection.

2. The method of claim 1, wherein the maintaining of the first communication connection and the establishing of the second communication connection corresponding to the second value, based on the change of the QoS from the first value to the second value comprises:
    based on the first communication connection being set to Wi-Fi, establishing one of LTE or 5G as the second communication connection; and
    based on the first communication connection being set to a first bearer of an LTE or 5G system, setting the second communication connection to a second bearer of the LTE or 5G system.

3. The method of claim 1, wherein the QoS includes at least one of a latency time, whether connection to the XR server is available, or a throughput.

4. The method of claim 1, further comprising:
    receiving, from an access server, information associated with a plurality of XR servers including the XR server;
    measuring QoS for each of the plurality of XR servers based on the information associated with the plurality of XR servers;
    determining candidate XR servers among the plurality of XR servers based on the QoS measured for each of the plurality of XR servers; and
    joining a group associated with the XR server determined by the access server among the candidate XR servers, to access the XR server.

5. The method of claim 4, wherein the measuring of the QoS for each of the plurality of XR servers based on the information associated with the plurality of XR servers comprises:
    measuring QoS for each RAT supported by the electronic device for each of the plurality of XR servers.

6. The method of claim 1, further comprising:
    receiving, from an access server, a list including information associated with first candidate XR servers determined by another electronic device;
    measuring QoS for each of the first candidate XR servers based on the information associated with the first candidate XR servers;
    determining second candidate XR servers among the first candidate XR servers based on the QoS measured for each of the first candidate XR servers; and
    joining a group associated with the XR server determined by the access server among candidate XR servers including the first candidate XR servers and the second candidate XR servers to access the XR server.

7. The method of claim 6, wherein the measuring of the QoS for each of the first candidate XR servers based on the information associated with the first candidate XR servers comprises:

measuring QoS for each RAT supported by the electronic device for each of the first candidate XR servers.

8. The method of claim 6, wherein the electronic device is an electronic device which is expected, by the access server to be within a specified proximity to another electronic device from the perspective of a network.

9. An electronic device comprising:

memory storing an extended reality (XR) application;

a transceiver; and at least one processor operatively coupled with the memory storing the XR application and the transceiver, wherein the at least one processor is configured to:

execute the XR application;

establish a first communication connection corresponding to a first value of quality of service (QoS) to receive data associated with an XR service from an XR server, based on the first value of the QoS required by the executed XR application;

maintain the first communication connection and establish a second communication connection corresponding to a second value, based on a change of the QoS from the first value to the second value;

receive data associated with the XR service from the XR server via the second communication connection, wherein the second communication connection includes one of radio access technology (RAT) different from the first communication connection or a bearer different from the first communication connection, wherein the at least one processor is further configured to:

identify that the QoS is changed to a third value greater than the first value and less than the second value;

disconnect the second communication connection, and establish a third communication connection corresponding to the third value; and maintain the first communication connection and receive data associated with the XR service from the XR server via the third communication connection.

10. The electronic device of claim 9, wherein the at least one processor in order to maintain the first communication connection and to establish the second communication connection corresponding to the second value, based on the change of the QoS from the first value to the second value, is configured to:

based on the first communication connection being set to Wi-Fi, establish one of LTE or 5G as the second communication connection; and based on the first communication connection being set to a first bearer of an LTE or 5G system, setting the second communication connection to a second bearer of the LTE or 5G system.

11. The electronic device of claim 9, wherein the QoS includes at least one of a latency time, whether connection to the XR server is available, or a throughput.

12. The electronic device of claim 9, wherein the at least one processor is configured to:

receive, from an access server, information associated with a plurality of XR servers including the XR server;

measure QoS for each of the plurality of XR servers based on the information associated with the plurality of XR servers;

determine candidate XR servers among the plurality of XR servers based on the QoS measured for each of the plurality of XR servers; and join a group associated with the XR server determined by the access server among the candidate XR servers to access the XR server.

13. The electronic device of claim 12, wherein the at least one processor in order to measure QoS for each of the plurality of XR servers based on the information associated with the plurality of XR servers, is further configured to:

measure QoS for each RAT supported by the electronic device, for each of the plurality of XR servers.

14. The electronic device of claim 9, wherein the at least one processor is further configured to:

receive, from an access server, a list including information associated with first candidate XR servers determined by another electronic device;

measure QoS for each of the first candidate XR servers based on the information associated with the first candidate XR servers;

determine second candidate XR servers among the first candidate XR servers, based on QoS measured for each of the first candidate XR servers; and join a group associated with the XR server determined by the access server among candidate XR servers including the first candidate XR servers and the second candidate XR servers to access the XR server.

15. The electronic device of claim 14, wherein the at least one processor is further configured to measure QoS for each RAT supported by the electronic device for each of the first candidate XR servers, for measuring of the QoS for each of the first candidate XR servers based on the information associated with the first candidate XR servers.

16. The electronic device of claim 14, wherein the electronic device is an electronic device which is expected, by the access server to be within a specified proximity to another electronic device from the perspective of a network.

* * * * *